US007627892B2

(12) United States Patent
Lin et al.

(10) Patent No.: US 7,627,892 B2
(45) Date of Patent: Dec. 1, 2009

(54) MULTIPLE METHODS FOR TRANSACTING, PUBLISHING AND PURCHASING COPYRIGHTED DIGITAL CONTENT

(75) Inventors: Yuh-Ren Lin, Tai Chung (TW);
Ho-Chien Hsu, Kao Hsiung (TW);
Wen-Hsi Yeh, Taipei (TW)

(73) Assignee: Industrial Technology Research Institute, Hsinchu County (TW)

( * ) Notice: Subject to any disclaimer, the term of this patent is extended or adjusted under 35 U.S.C. 154(b) by 751 days.

(21) Appl. No.: 11/169,661

(22) Filed: Jun. 30, 2005

(65) Prior Publication Data
US 2006/0143690 A1 Jun. 29, 2006

(30) Foreign Application Priority Data
Dec. 24, 2004 (TW) ............................... 93140681 A

(51) Int. Cl.
| G06F 7/04 | (2006.01) |
| G06F 17/30 | (2006.01) |
| G06F 21/00 | (2006.01) |
| H04L 9/32 | (2006.01) |
| H04L 29/06 | (2006.01) |
| G06Q 30/00 | (2006.01) |
| G07G 1/14 | (2006.01) |
| G06G 1/12 | (2006.01) |
| G06Q 20/00 | (2006.01) |

(52) U.S. Cl. ............................ 726/2; 713/165; 705/14; 705/21; 705/51; 705/52; 705/57; 705/59; 705/76

(58) Field of Classification Search .................... 726/2; 705/21, 51, 52, 57
See application file for complete search history.

(56) References Cited

U.S. PATENT DOCUMENTS

| 6,754,642 B2 | 6/2004 | Tadayon et al. | |
| 2002/0108050 A1 | 8/2002 | Raley et al. | |
| 2003/0236756 A1* | 12/2003 | Humpleman et al. | .......... 705/76 |
| 2004/0139318 A1* | 7/2004 | Fiala et al. | .................. 713/165 |
| 2004/0162784 A1* | 8/2004 | Tadayon et al. | ............... 705/51 |
| 2005/0021398 A1* | 1/2005 | McCleskey et al. | ........... 705/14 |
| 2005/0038707 A1* | 2/2005 | Roever et al. | ................. 705/21 |
| 2005/0071280 A1* | 3/2005 | Irwin et al. | .................... 705/59 |
| 2005/0108173 A1* | 5/2005 | Stefik et al. | .................... 705/57 |
| 2006/0031168 A1* | 2/2006 | Remi | .......................... 705/52 |

FOREIGN PATENT DOCUMENTS

| TW | 200302424 | 12/2002 |
| TW | 515955 | 1/2003 |
| TW | 528956 | 4/2003 |
| TW | 571218 | 1/2004 |

* cited by examiner

*Primary Examiner*—Shin-Hon Chen
(74) *Attorney, Agent, or Firm*—Rabin & Berdo, P.C.

(57) ABSTRACT

A method is disclosed for transacting, purchasing and publishing copyrighted digital content that solves problems of the digital copyright that could not protect by methods of the prior art. The present invention allows various sales methods and licensing methods by using a copyrighted digital content description file, and effectively controls the user's use of the copyrighted digital content.

48 Claims, 14 Drawing Sheets

MULTIPLE METHODS FOR TRANSACTING, PUBLISHING AND PURCHASING COPYRIGHTED DIGITAL CONTENT

BACKGROUND OF THE INVENTION

1. Field of the Invention

The present invention is related to multiple methods for transacting, publishing and purchasing copyrighted digital content, and more particularly, to a copyrighted digital content publishing and management mechanism that provides a method for cooperation between different actors. The present invention achieves various sales methods and licensing methods through publishing copyrighted digital content description files, and effectually controlling the user's legal right to use copyrighted digital content.

2. Description of Related Art

A digital content provider currently has two methods in which they can publish digital content. Firstly, the digital content provider can provide a full copyright publishing mechanism including searching for, paying for and publishing the content. Otherwise the digital content provider can give a digital content file to a content publishing platform service provider and the content publishing platform service provider provides the publishing services. Either way, a full copyright publishing mechanism is provided from a single digital content provider.

Up until recently, each digital content provider manufactured their original content and designed and marketed the product. Following the development of the digital content industry, a professional division of labor has become established. Currently different digital content providers maintain their individual advantages in their own fields. However, without cooperating with other groups, most are incapable of finishing or publishing digital content by themselves.

A digital content provider provides an account and password for a user. To create an authorization-ID, the digital content provider utilizes a Public Key Infrastructure (PKI) framework. The PKI framework is a scheme to sign and verify digital signatures. The digital content provider provides content and services only as described and permitted by the copyright owner. Some digital content providers do describe to their users the various rights and limitations placed on their usage of the content. However, a digital content provider cannot limit the user's actual use of the content and services after they have accessed it. These digital content providers utilize digital copyright description language and match a digital content accessing program with the content in an attempt to limits use by users that falls outside of the copyright. In general, a user must first connect to the application server of the digital content provider through a network. Next, the application server must be in accordance with the login account and password to create the authorization-ID so that the digital content file may be accessed.

There are several disadvantages to the above method designed for accessing different digital content programs. If the user wants to use a particular piece of digital content, the user must install the appropriate accessing program. This is inconvenient for the user. This method only provides a pre-paid copyright online use method, while the original copyright owner cannot directly control the digital content publishing rights and define the license range rights. Before the content provider can use copyrighted material, they must define and reach an agreement with the copyright owner. It is a part of the software that cannot be modified by the user.

TW Publication No. 200302424, "System and method for controlling distribution of digital copyrighted material", discloses a system and a method for direct peer-to-peer marketing of copyrighted digital products in which the seller and the purchaser of a copyrighted digital product are rewarded or compensated. Illegal distribution of the copyrighted product is meanwhile substantially prevented.

TW patent No. 515955, "System and read method of license data", discloses a system and a read method of licensing data for a server's user utilities application software.

TW patent No. 528956, "Resource access license method and system", discloses a novel method for a resource access license method and system. The method decreases the licensing fees that corporations pay to software service providers for developing software.

TW patent No. 571218, "Copyrighted digital content management system and method", discloses a novel method for how license usage services apply for download digital content. The method makes certain digital content incapable of being used by illegal users.

US. Publication No. 20020108050 "System and Method for digital rights management using a standard rendering engine", discloses a method and apparatus for facilitating distribution of protected documents displayed with the rendering engine of a standard application program, such as an Internet web browser.

U.S. Pat. No. 6,754,642 "Method and apparatus for dynamically assigning usage rights to digital works" discloses a method and an apparatus that monitors usage and adjusts usage rights in a predetermined method based upon the status of dynamic conditions.

SUMMARY OF THE INVENTION

For eliminating the defects in the prior art, the applicant proposes a method for transacting and publishing copyright digital content.

The main objective of the present invention is to provide a copyrighted digital content publishing and management mechanism that provides a method of co-operation between different actors. The present satisfies various sales and licensing methods.

For achieving the objectives above, the present invention provides a manufacturing process for a method for transacting and publishing of copyrighted digital content, including the steps of: registering at least one digital content provider's account information on a transaction platform; registering at least one digital content provider's information on a retrieval platform; uploading at least one digital content file to the retrieval platform, the digital content being provided by the at least one digital content provider or a copyright owner; a user searching for the digital content on the retrieval platform; the retrieval platform searching the digital content(s) for registered digital contents; matching the digital content file and license method provided by the digital content provider; User select the desired digital content and an authorization method from the retrieval platform; obtaining a payment receipt for the digital content with the user paying the fee to a transaction platform; the user sends payment receipt to the digital content provider who published the digital content; the digital content provider publishes a new copyrighted digital content description file for the user after verifying the payment receipt's validity; When a period time pass, the digital content provider collects all users' payment receipts and sends it to the transaction platform to charge the fees.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1A:
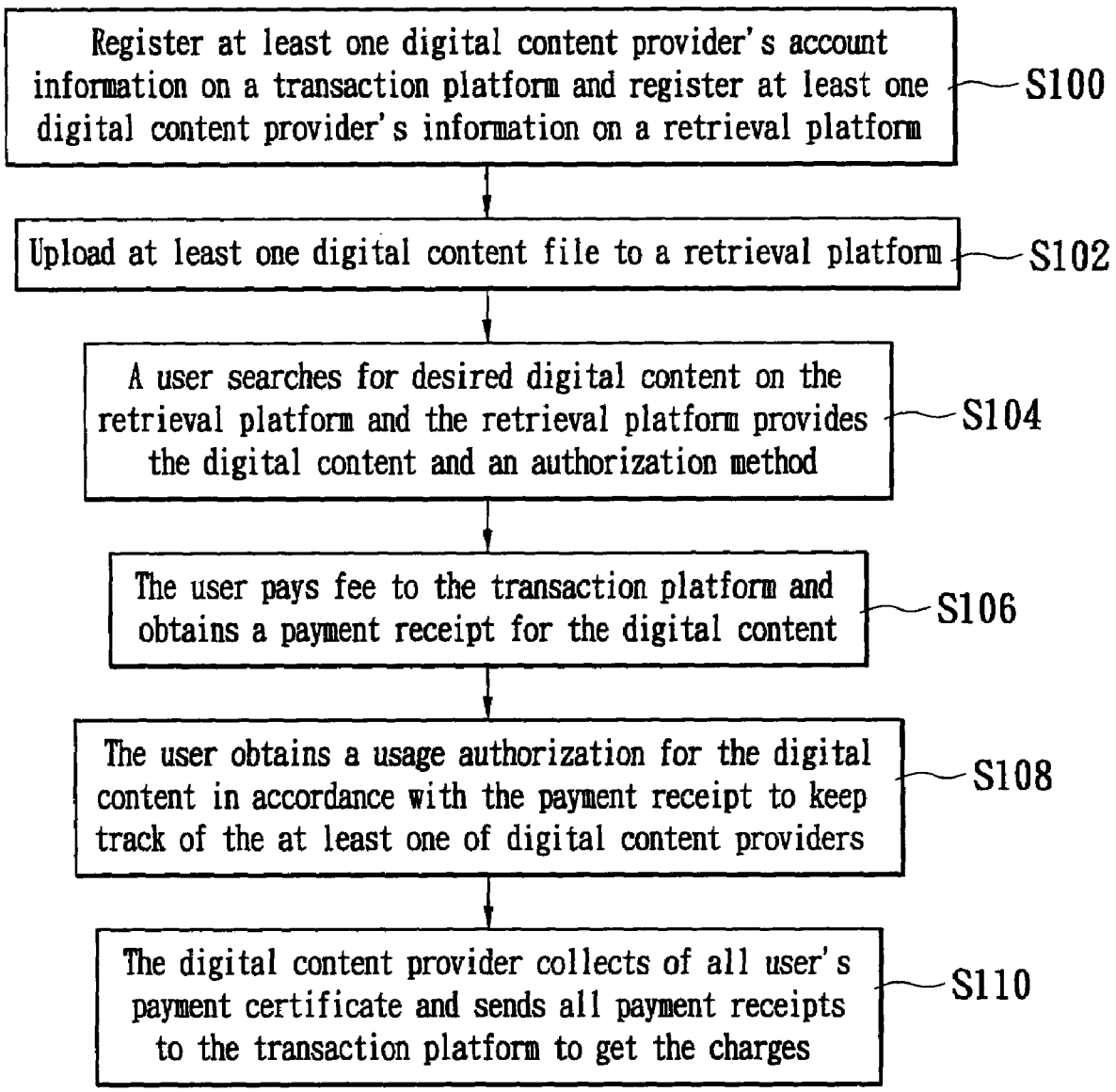
FIG. 1A shows a flowchart for the method for transacting, publishing and for paying for the use of copyrighted digital content of the present invention.
Figure 1B:
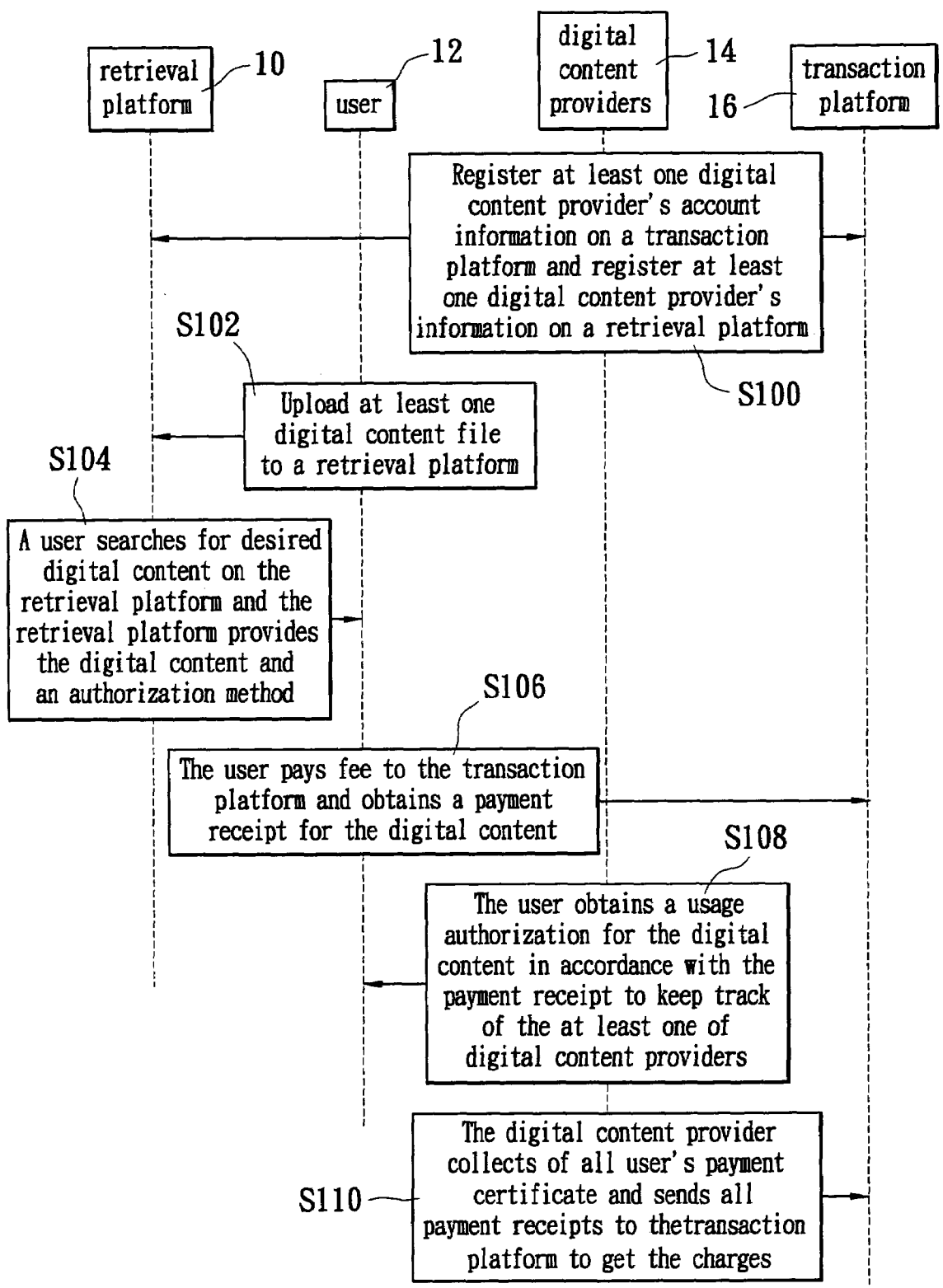
FIG. 1B shows an architecture time-domain diagram of FIG. 1A.

FIG. 1A shows a flowchart for the method for transacting and publishing copyrighted digital content of the present invention. FIG. 1B shows an architecture time-domain diagram of FIG. 1A. The method comprises of: registering at least one digital content provider's 14 bank account information on a transaction platform 16 and registering at least one digital content provider's information on a retrieval platform 10 (S100); uploading at least one digital content file to a retrieval platform 10 (S102), the digital content being provided by the at least one digital content provider 14, wherein the digital content file includes a digital copyright description file. The digital copyright description file includes a copyright declaration and authorization method(s) information. The digital content can be stored, demonstrated or applied using digital methods, wherein the digital file can be software, a game, music, a video image or a digital picture.

A user 12 searches for desired digital content on the retrieval platform 10 and the retrieval platform 10 provides the digital content and authorization method(s) (S104), wherein the user is a person or a digital content provider. The authorization method includes a prepaid copyright online use method, a pay per online use method, a fixed number of times postpaid online use method, a fixed time period postpaid online use method and a prepaid copyright offline use method. The user 12 pays fee to the transaction platform 16 and obtains a payment receipt for the digital content (S106). The user 12 obtains a usage authorization for the digital content in accordance with the payment receipt so that the user may connect with the digital content provider 14 (S108) to use the digital content, after the digital content provider 14 has received and verified payment receipt's validity, the digital content provider issues a new digital content copyright description file for the user 12 only which description file is different with the one including in the registered in the retrieval platform; the digital content provider collects of all user's payment receipt and sends all payment receipts to the transaction platform to get the charges (S110).

Figure 2A:
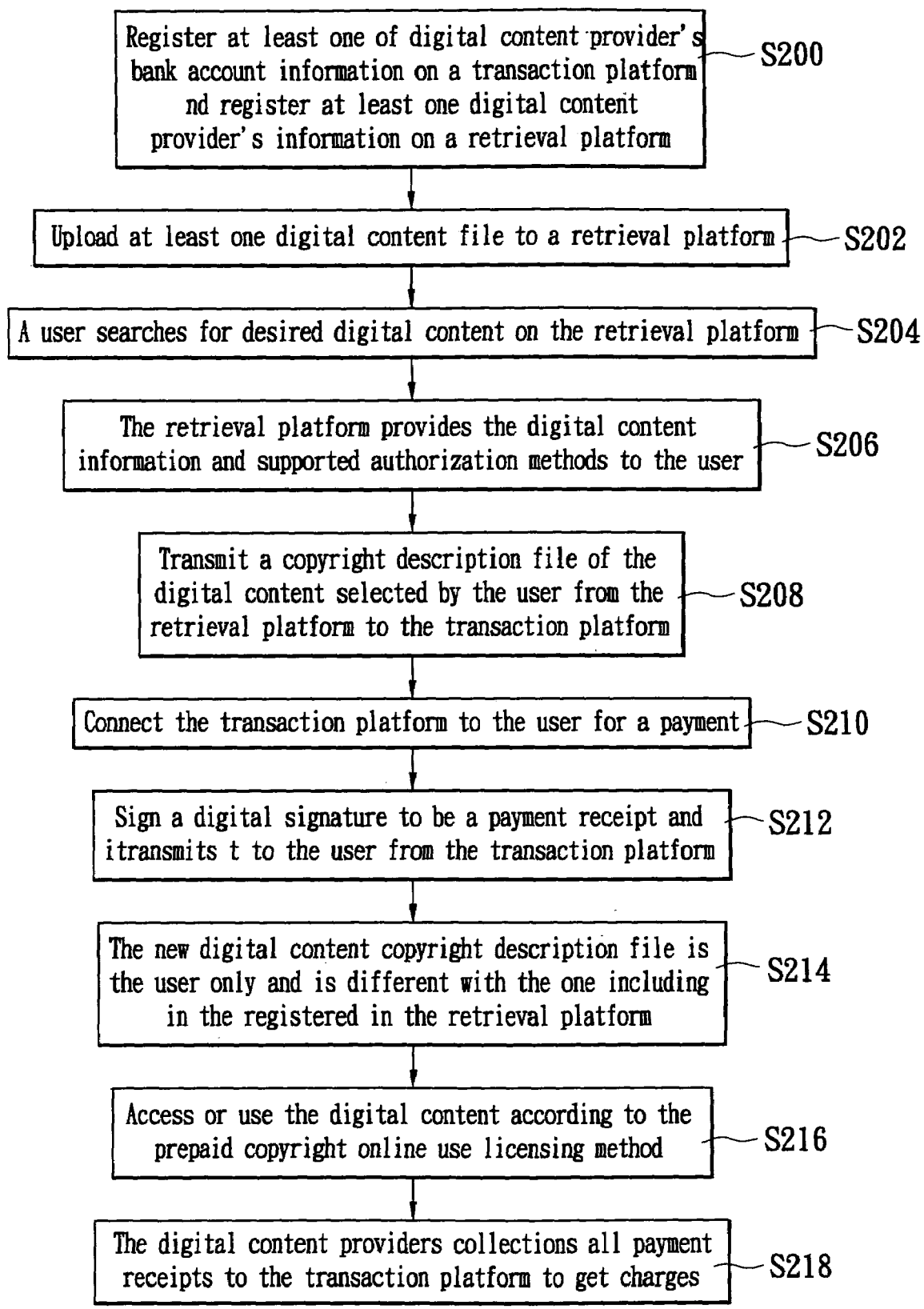
FIG. 2A shows a flowchart for the method for paying for the use of copyrighted digital content using the method of purchasing the copyright from the producer online of the present invention.
Figure 2B:
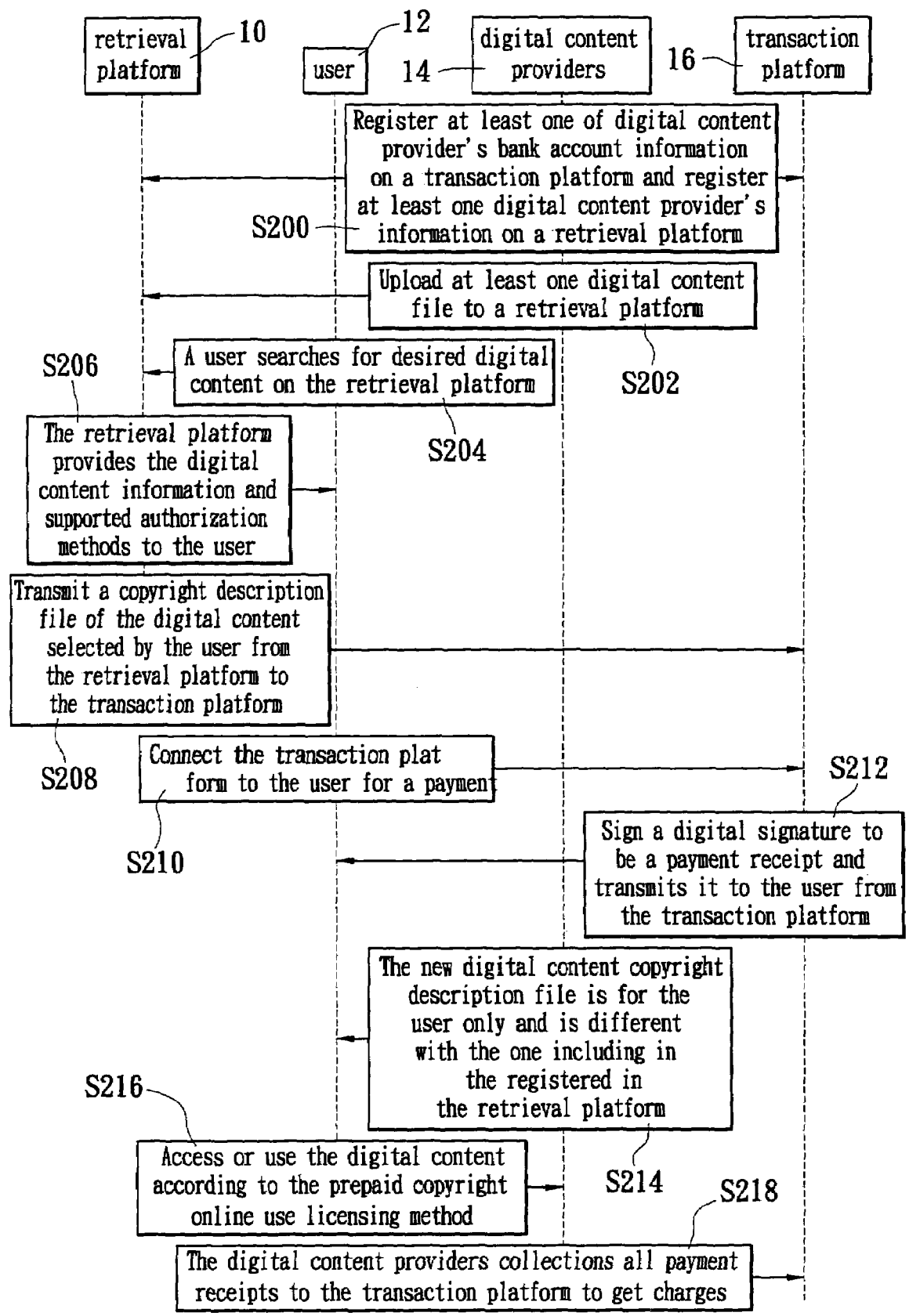
FIG. 2B shows an architecture time-domain diagram of FIG. 2A.

FIG. 2A shows a flowchart for the method of transacting and publishing copyrighted digital content with the prepaid copyright online use method of the present invention. FIG. 2B shows an architecture time-domain diagram of FIG. 2A. The method comprises of registering at least one of digital content provider's 14 bank account information on a transaction platform 16 and registering at least one digital content provider's information on a retrieval platform 10 (S200); uploading at least one digital content file to a retrieval platform 10 (S202), the digital content being provided by at least one digital content provider 14, wherein the digital content file includes a digital content copyright description file. The digital copyright description file includes a copyright declaration and authorization methods information. The digital content can be stored, demonstrated or applied using digital methods, wherein the digital file can be software, a game, music, a video image or a digital picture.

A user 12 searches for desired digital content on the retrieval platform 10 (S204), the user can be a person or a digital content provider; the retrieval platform 10 provides the digital content information and supported authorization methods to the user 12 (S206); the user 12 decides to buy the digital content in the online prepaid using method; transmitting a copyright description file of the digital content selected by the user 12 from the retrieval platform 10 to the transaction platform 16 (S208); connecting the transaction platform to the user 12 for payment (S210), wherein the method of payment could use a credit card, an Internet banking service, a micro payment, an ATM service or any new type of payment methods developed in the future; Sign a digital signature to be a payment receipt and transmits it to the user 12 from the transaction platform 16 (S212). The digital signature further includes the copyrighted digital content description file, the user selected licensing method and a record of the time of purchase.

The user applies to the digital content provider 14 for the legal usage rights to the digital content with the payment receipt; the digital content provider verifies the digital signature and issues a new digital content copyright description file according to the user's information, the new digital content copyright description file is for the user 12 only and is different with the one including in the registered in the retrieval platform (S214); accessing or using the digital content according to the prepaid copyright online use licensing method (S216); the digital content provider 14 collects all payment receipts to the transaction platform 16 to get charges (S218).

Figure 3A:
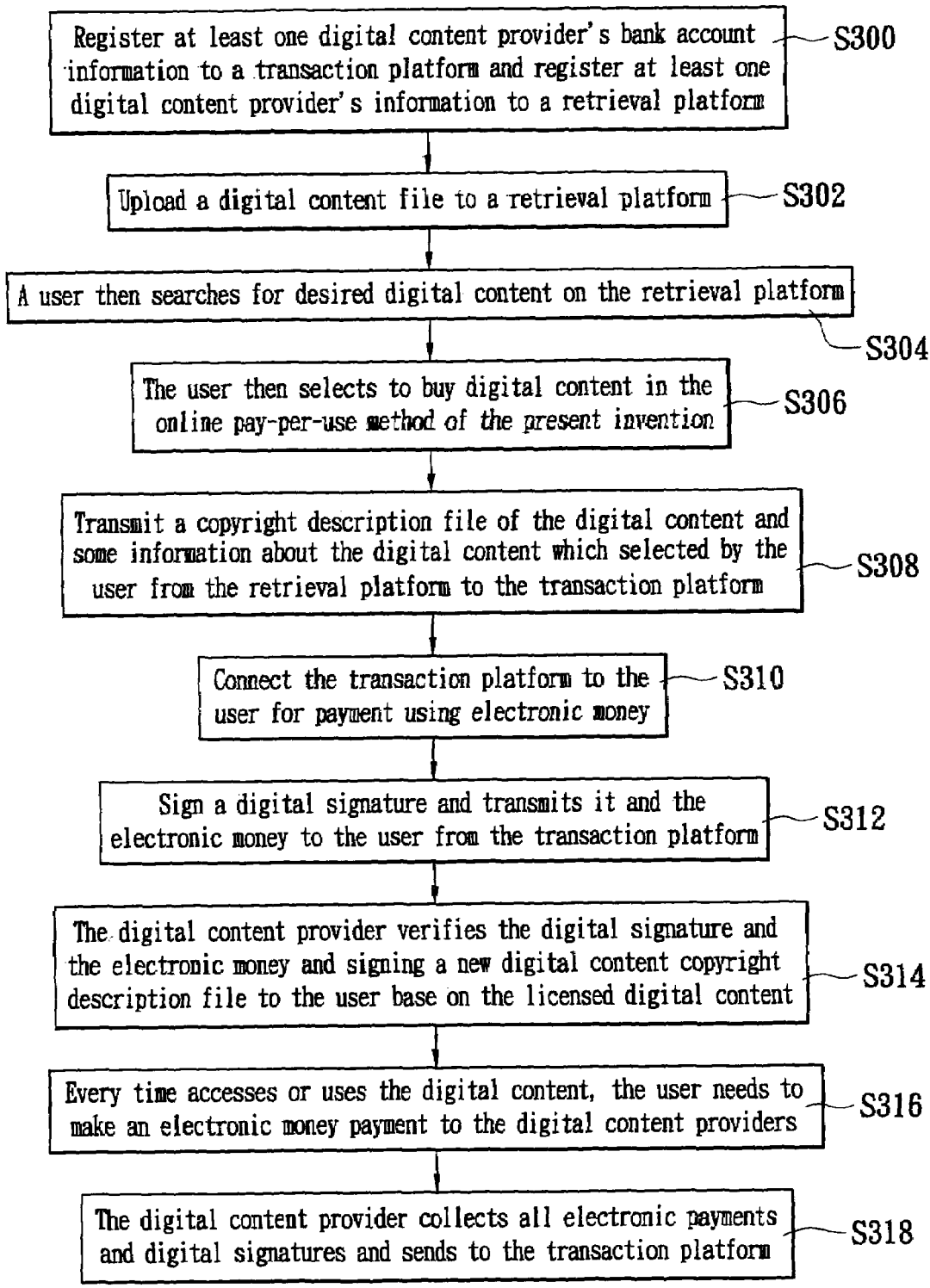
FIG. 3A shows a flowchart for the method for paying for the use of copyrighted digital content using the online pay-per-use method of the present invention.
Figure 3B:
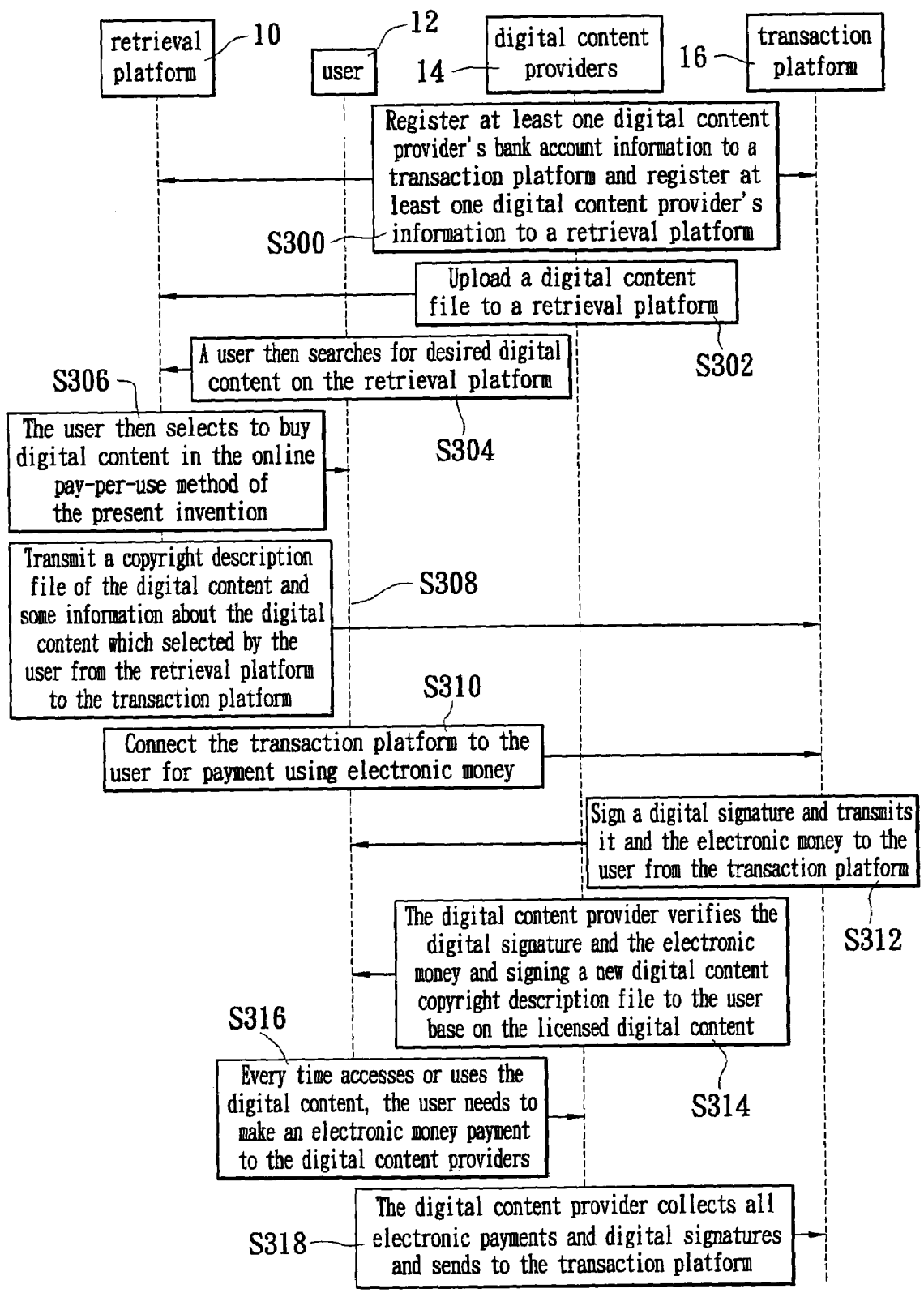
FIG. 3B shows an architecture time-domain diagram of FIG. 3A.

FIG. 3A shows a flowchart for the method for transacting, purchasing and publishing of copyrighted digital content using the online pay-per-use method of the present invention. FIG. 3B shows an architecture time-domain diagram of FIG. 3A. The method comprises of: registering at least one digital content provider's 14 bank account information to a transaction platform 16 and registering at least one digital content provider's information to a retrieval platform 10 (S300); uploading at least one digital content file to a retrieval platform 10 (S302), the digital content being provided by at least one digital content provider 14, wherein the digital content file includes a digital content copyright description file. The digital copyright description file includes a copyright declaration and authorization methods information. The digital content can be stored, demonstrated or applied using digital methods, wherein the digital file can be software, a game, music, a video image or a digital picture.

A user 12 searches for desired digital content on the retrieval platform 10 (S304), wherein the user can be a person or a digital content provider, the retrieval platform 10 provides the digital content information and authorization methods to the user 12; the user 12 then selects to buy digital content in the online pay-per-use method of the present invention (S306); transmitting a copyright description file of the digital content and some information about the digital content which selected by the user 12 from the retrieval platform 16 to the transaction platform 10 (S308); connecting the transaction platform 10 to the user 12 for purchasing electronic money (S310), wherein the method of payment is a credit card, an internet banking service, a micro payment, an ATM service or any new type of payment that may be developed in the future. The electronic money could be a cash card points card or a micro payment; sign a digital signature to be payment receipt and transmits 10 with the electronic money to the user 12 from the transaction platform (S312); the digital content provider 14 verifies the digital signature and the electronic money and signing a new digital content copyright description file to the user 12 based on the licensed digital content (S314); every time the user accesses or uses the digital content, the user 12 needs to make an electronic payment to the digital content provider 14 (S316); the digital content provider 14 collects all electronic payments and payment receipt and sends to the transaction platform 10 (S318), wherein the predetermined value is a fixed number of times (for example, every 1000 times) or a fixed time period (for example, one week or one month).

Figure 4A:
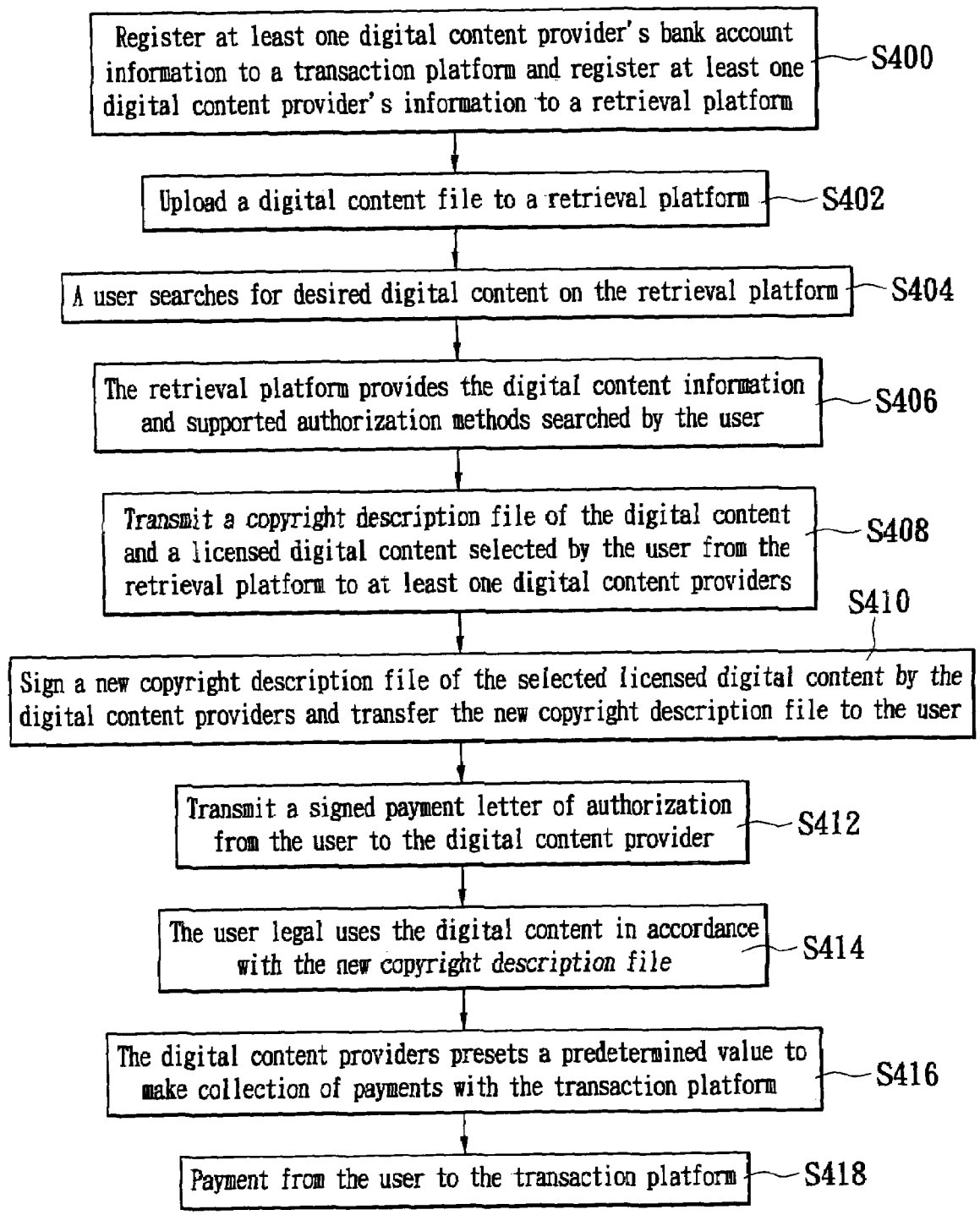
FIG. 4A shows a flowchart for the method for paying for the use of copyrighted digital content a fixed number of times or for a fixed time period online after the user has finished using the copyrighted digital content of the present invention.
Figure 4B:
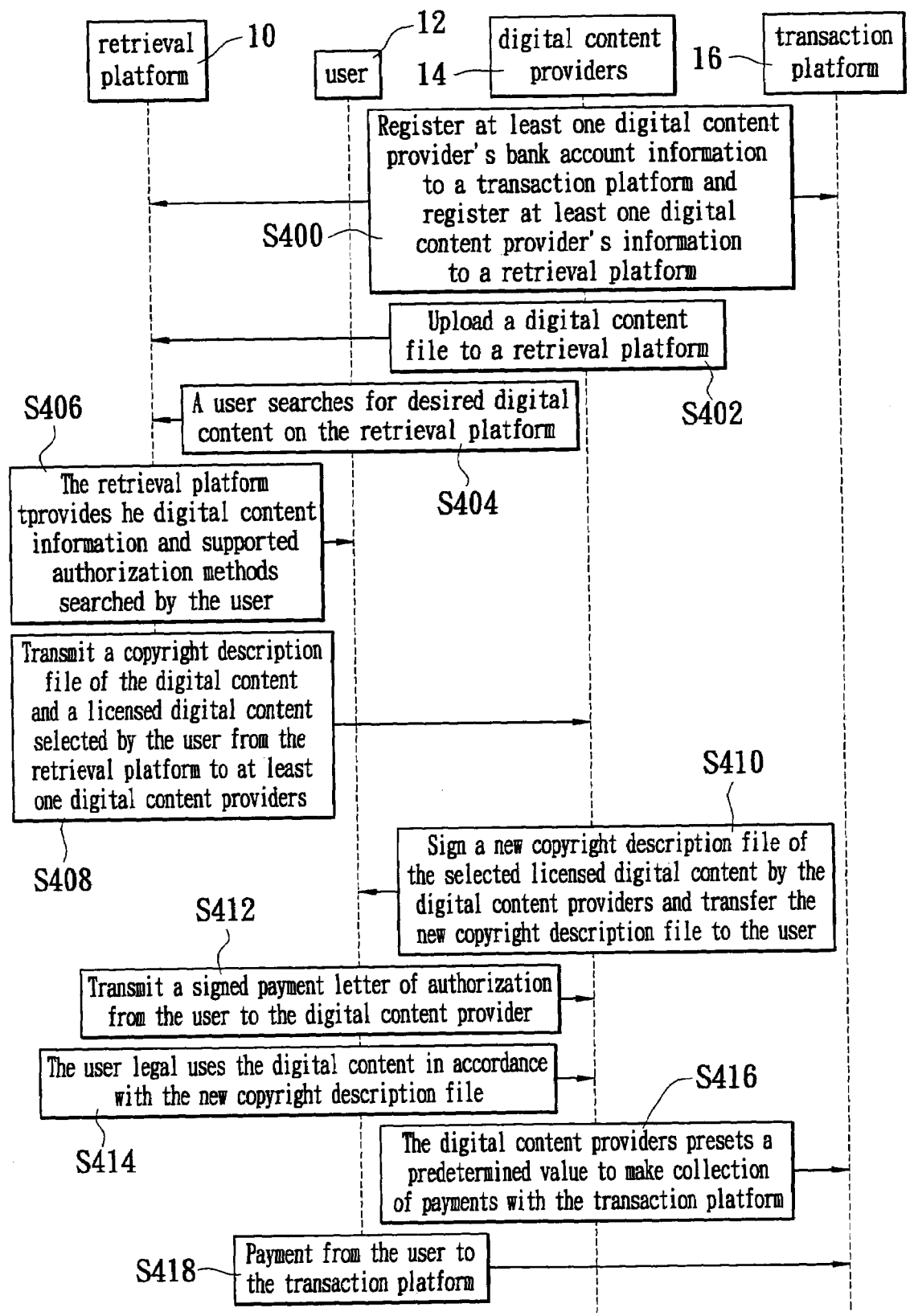
FIG. 4B shows an architecture time-domain diagram of FIG. 4A.

FIG. 4A shows a flowchart for the method for paying for the use of copyrighted digital content a fixed number of times or for a fixed time period online, after the user has finished using the copyrighted digital content. FIG. 4B shows an architecture time-domain diagram of FIG. 4A. The method comprises of registering at least one digital content provider's 14 bank account information to a transaction platform 16 and registering at least one digital content provider's information to a retrieval platform 10 (S400); uploading at least one digital content file to a retrieval platform 10 (S402); the digital content being provided by at least one digital content provider 14, wherein the digital content file includes a digital content copyright description file. The digital copyright description file includes a copyright declaration and authorization methods information. The digital content can be stored, demonstrated or applied using digital methods, wherein the digital file can be software, a game, music, a video image or a digital picture.

A user 12 searches for desired digital content on the retrieval platform 10 (S404), wherein the user can be a person or a digital content provider. The retrieval platform 10 provides the digital content information and supported authorization methods searched by the user 12 (S406); the user 12 selects to buy the digital content using the method for paying for the use of copyrighted digital content a fixed number of times or for a fixed time period online, after the user has finished using the copyrighted digital content; transmitting a copyright description file of the digital content and a licensed digital content selected by the user 12 from the retrieval platform 10 to the digital content provider (S408); issuing a new copyright description file of the selected licensed digital content by the digital content provider 14 and transferring the new copyright description file to the user 12 (S410), wherein the new copyright description file includes ticket information; transmitting a signed payment letter of authorization from the user 12 to the digital content provider 14 (S412), wherein the payment letter of authorization comprises a digital content description file, payment information and a record of the time of the transaction; the user 12 legal uses the digital content in accordance with the new copyright description file (S414), wherein the digital content provider 14 in accordance with the ticket information records the number of times and the time of any usage of the digital content by the user 12; the digital content provider 14 presets a predetermined value to make collection of payments from users to the transaction platform 16 to get charges (S416); payment from the user to the transaction platform (S418), wherein the method of payment can be a credit card, an Internet banking service, a micro payment, an ATM service or any new type of payment method developed in the future.

Figure 5A:
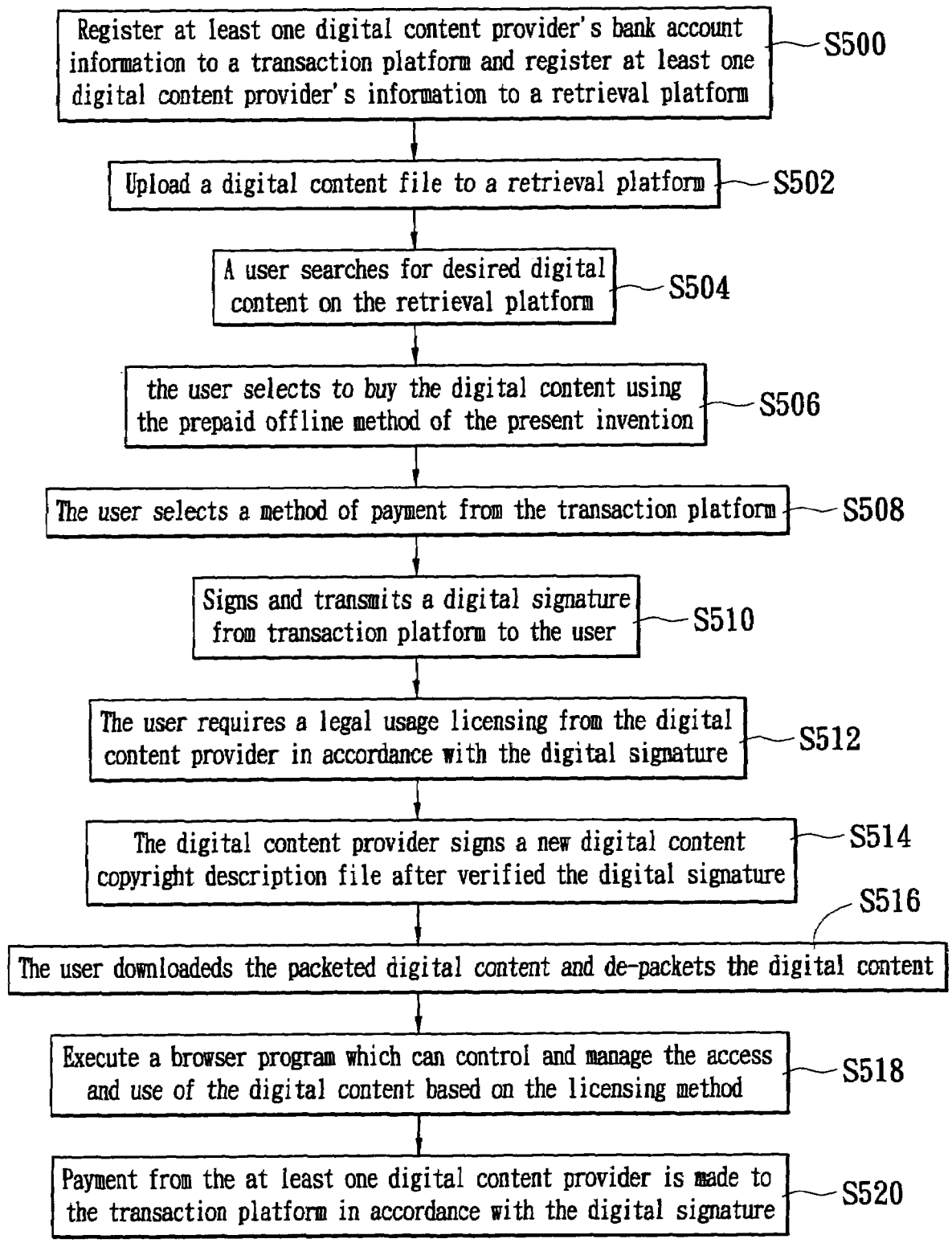
FIG. 5A shows a flowchart for the method for paying for the use of copyrighted digital content using the prepaid offline method of the present invention.
Figure 5B:
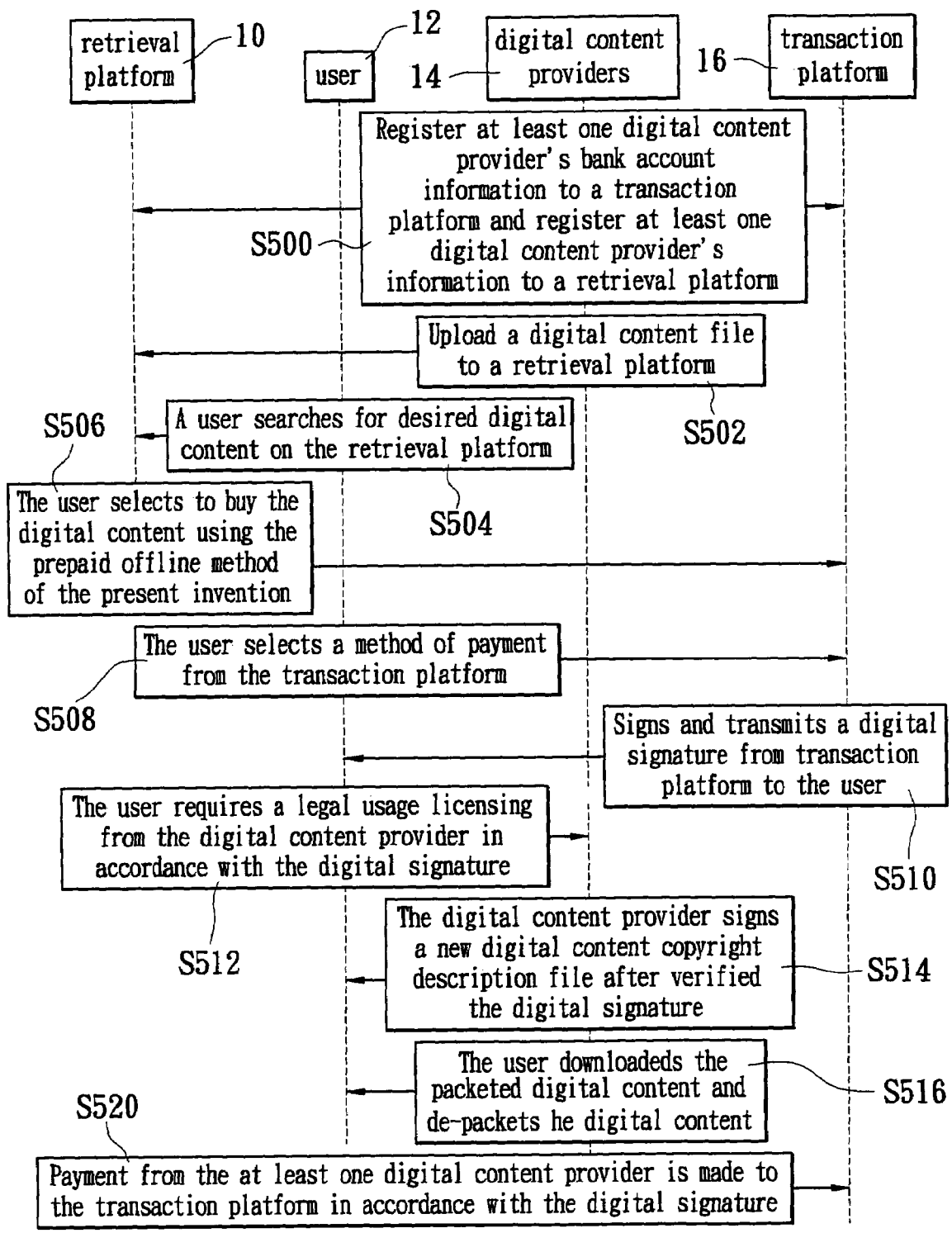
FIG. 5B shows an architecture time-domain diagram of FIG. 5A.

FIG. 5A shows a flowchart for the method for paying for the use of copyrighted digital content using the prepaid offline method of the present invention. FIG. 5B shows an architecture time-domain diagram of FIG. 5A. The method comprises of registering at least one digital content provider's 14 bank account information to a transaction platform 16 and registering at least one digital content provider's information to a retrieval platform 10 (S500); uploading at least one digital content file to a retrieval platform 10 (S502); the digital content being provided by at least one digital content provider 14, wherein the digital content file includes a digital content copyright description file; the digital copyright description file includes a copyright declaration and authorization methods information. The digital content can be stored, demonstrated or applied using digital methods, wherein the digital file can be software, a game, music, a video image or a digital picture.

A user 12 searches for desired digital content on the retrieval platform 10 (S504), wherein the user can be a person or a digital content provider, The retrieval platform 10 provides the digital content information and supported authorization methods searched by the user 12; the user 12 selects to buy the digital content using the prepaid offline method of the present invention (S506); connecting the transaction platform 16 to the user 12 for payment (S508), wherein the method of payment can be a credit card, an Internet banking service, a micro payment, an ATM service or any new type of payment method developed in the future; signs and transmits a digital signature to be payment receipt from the transaction platform 16 to the user 12 (S510); the digital signature comprises of a copyrighted digital content description file, the method of licensing as selected by the user and a record of the time of the transaction transmitted from the retrieval platform 10.

The user 12 requires a legal usage licensing from the digital content provider 14 in accordance with the payment receipt (S512); the digital content provider 14 signs a new digital content copyright description file after verified the digital signature (S514); the digital content provider 14 packet the digital content, wherein the packet step encrypts the digital content using a session key with a symmetric key encryption algorithm. The session key is encrypted using the user's public key and put in the new digital content copyright description file which is the user use only; different with the one in the retrieval platform 10. The user 12 downloads the packeted digital content and de-packets the digital content (S516), wherein the de-packet step decrypts the session key using user's private key and decrypts the digital content using the session key; use the digital content based on the licensing method with a browser program or a hardware device which can control and manage the access of user (S518); the digital content provider collects of all user's payment receipt and sends to the transaction platform to get the charges (S520).

Figure 6A:
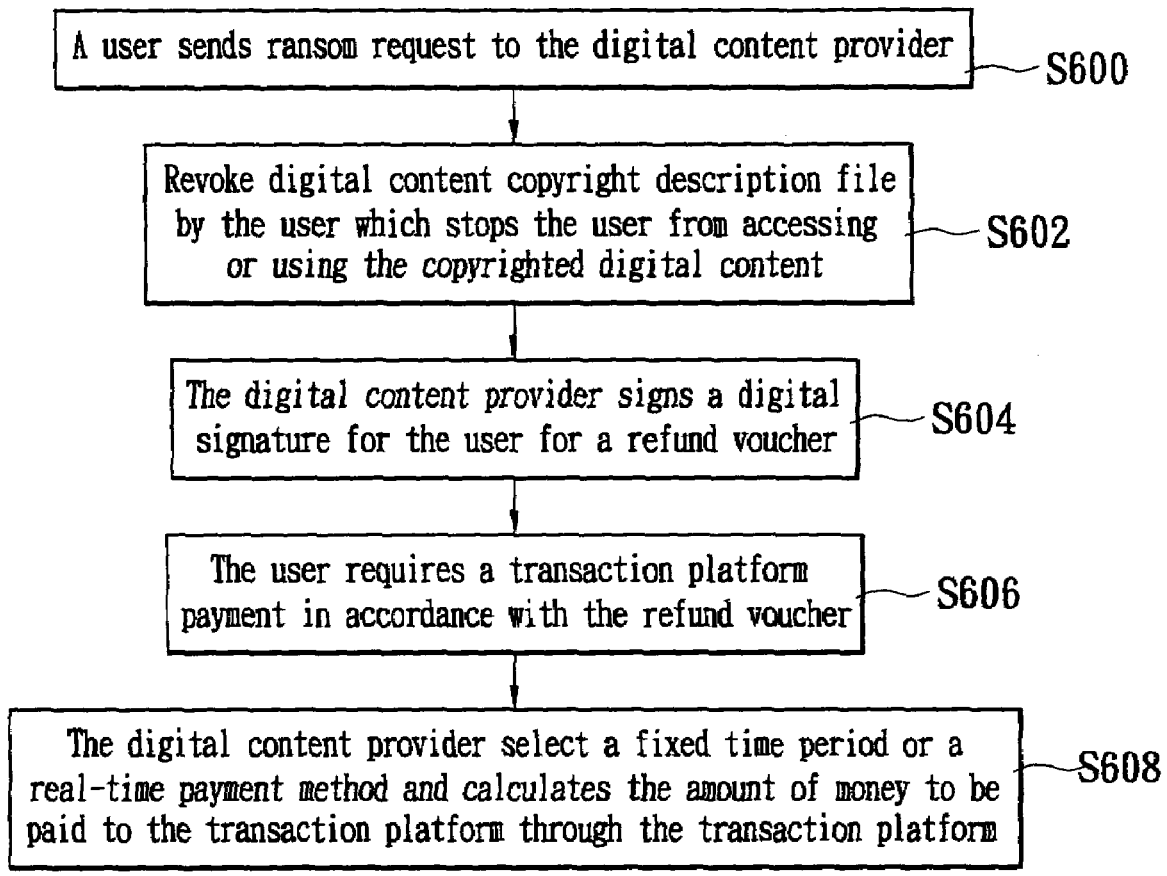
FIG. 6A shows a flowchart for the method for ransoming the user purchased copyrighted digital content of the present invention.
Figure 6B:
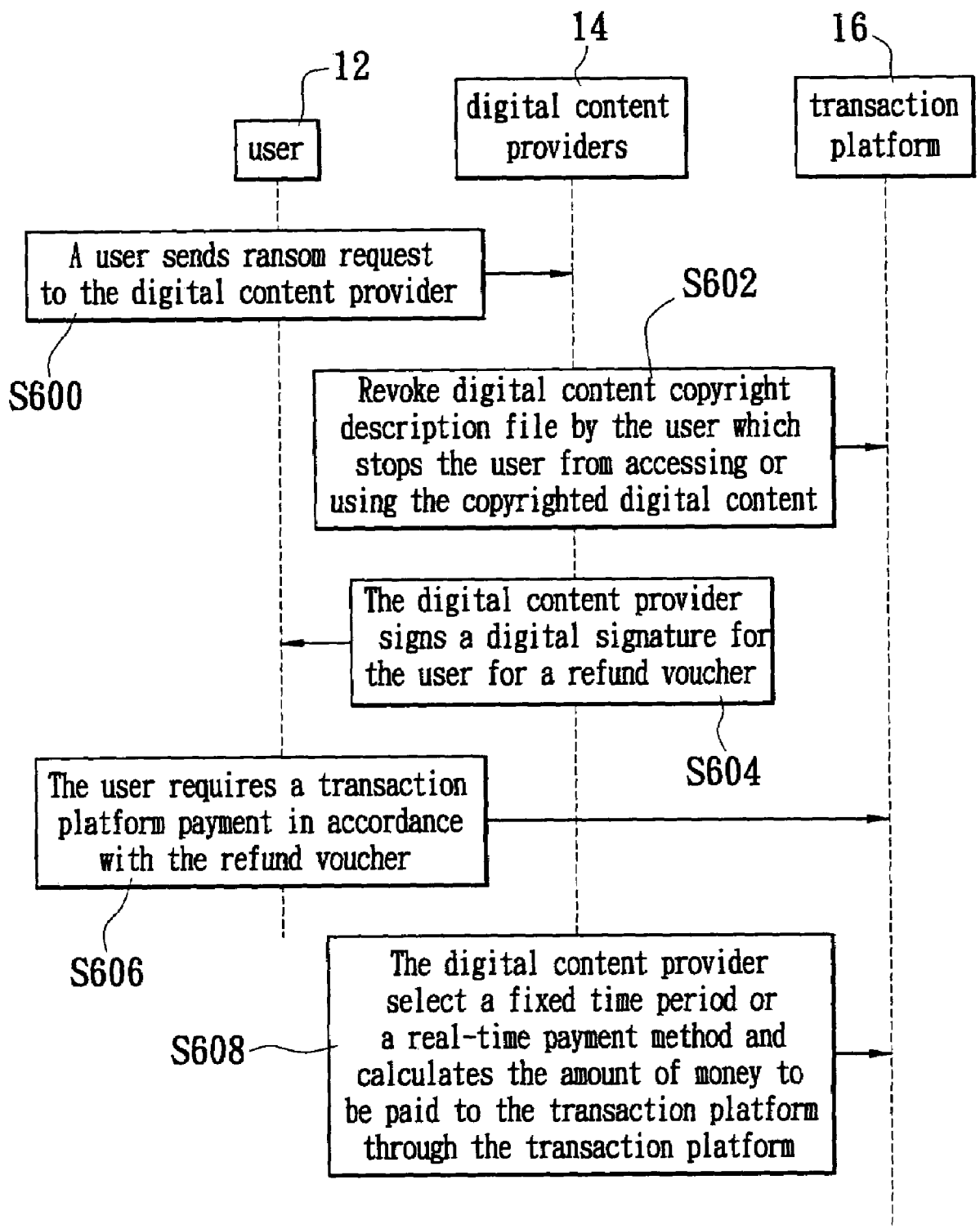
FIG. 6B shows an architecture time-domain diagram of FIG. 6A.

FIG. 6A shows a flowchart for the method for ransoming for purchased copyrighted digital content online of the present invention. FIG. 6B shows an architecture time-domain diagram of FIG. 6A.

The method comprises of a user 12 sends ransom request to the digital content provider 14 (S600), wherein a usage licensing agreement for the copyrighted digital content must available to the user 12, wherein the user can be a person or a digital content provider; revoking digital content copyright description file by the user which stops the user from accessing or using the copyrighted digital content anymore (S602); the digital content provider 14 signs a digital signature for the user 12 for a refund voucher (S604), wherein the digital signature comprises of a copyright description file, refund information and a record of the time of the transaction; the user 12 requires a transaction platform 10 payment in accordance with the refund voucher (S606); the digital content provider select a fixed time period or a real-time payment method and calculates the amount of money to be paid to the transaction platform 10 through the transaction platform (S608), wherein the method of payment is a credit card, an Internet banking service, or any new type of payment method developed in the future.

Figure 7A:
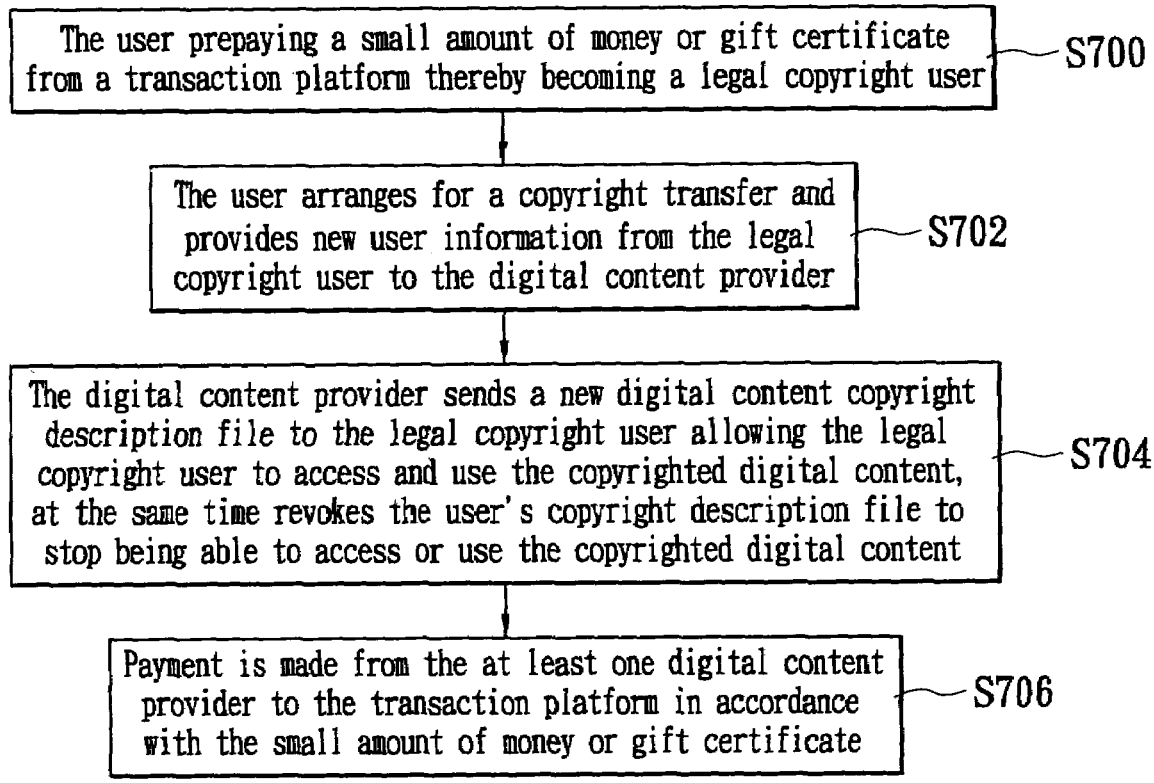
FIG. 7A shows a flowchart for the method for transferring purchased digital content's copyright to someone of the present invention.
Figure 7B:
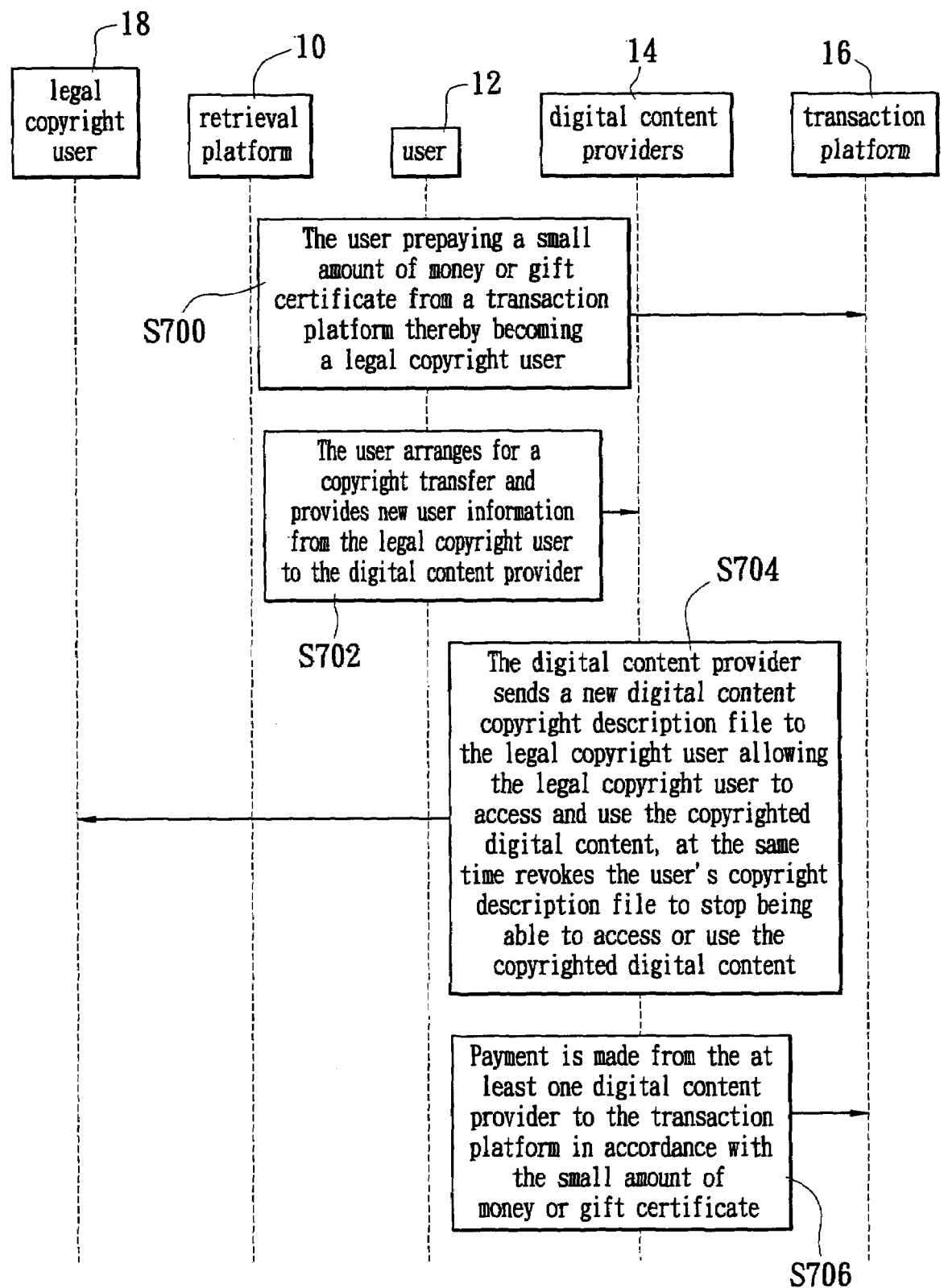
FIG. 7B shows an architecture time-domain diagram of FIG. 7A.

FIG. 7A shows a flowchart for the method for purchasing and transferring copyrighted digital content online of the present invention. FIG. 7B shows an architecture time-domain diagram of the FIG. 7A. The method comprises of the user 12 prepaying a small amount of money or gift certificate from a transaction platform 16 thereby becoming anew legal copyright user 18 (S700), wherein the user can be a person or a digital content provider and the method of payment is a credit card, an Internet banking service or any new type of payment method developed in the future. The user 12 requests for a copyright transfer and provides new user information from the legal copyright user 18 to the digital content provider 14 (S702); the digital content provider 14 issues a new digital content copyright description file to the legal copyright user 18 allowing the legal copyright user 18 to access and use the copyrighted digital content, at the same time revokes the user's 12 copyright description file to stop accessing or using the copyrighted digital content (S704); payment is made from the at least one digital content provider 14 to the transaction platform 16 in accordance with the small amount of money or gift certificate (S706). To sum up, in this method the user 12 is stopped from accessing or using the copyrighted digital content and the old copyrighted digital content description file becomes useless. As such, the user 12 cannot access or use it anymore. The legal copyright user 18 can legally access and use the digital content in accordance with the new copyrighted digital content description file.

The present invention provides a copyrighted digital content publishing and management mechanism that provides for co-operation between different actors. The present invention makes possible the transacting, publishing and paying for the rights to use copyrighted digital content using the following methods:

1) purchasing the copyright from the producer online,
2) using the online pay-per-use method,
3) paying for the use of copyrighted digital content a fixed number of times or for a fixed time period online after the user has finished using the copyrighted digital content,
4) paying for the use of copyrighted digital content using the prepaid offline method,
5) ransoming for purchased copyrighted digital content online, and
6) purchasing and transferring copyrighted digital content online.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A method for transacting, purchasing and publishing copyrighted digital content, comprising:
   providing digital content files on a retrieval platform, each digital content file being provided by a digital content provider and having a copyright description file describing copyright information of the digital content file and authorization methods required by the digital content provider;
   searching for a specific digital content file from the digital content files on the retrieval platform by a user;
   obtaining a payment receipt for the specific digital content file from a transaction platform by the user using one of the authorization methods of the specific digital content file, and sending the obtained payment receipt to a corresponding digital content provider of the specific digital content file;
   issuing a new copyright description file for the specific digital content file to the user by the corresponding digital content provider upon receiving the payment receipt, so as to allow the user to use the specific digital content file; and
   collecting payment receipts for the digital content files for each digital content provider and sending the payment receipts to the transaction platform for obtaining payments.

2. The method as claimed in claim 1, further comprising:
   registering each digital content provider at the retrieval platform; and
   registering bank account information to the transaction platform for each digital content provider.

3. The method as claimed in claim 1, wherein each digital content file can be stored, demonstrated or applied using a digital methods, and the digital content file can be software, a game, music, a video image or a digital picture.

4. The method as claimed in claim 1, wherein the user is a person or a digital content provider.

5. The method as claimed in claim 1, wherein the authorization methods includes an online purchasing method, an online pay-per-use method, a method in which the user pays for using copyrighted digital content a fixed number of times or for a fixed time period online, and a prepaid offline method.

6. A method for transacting, purchasing and publishing a copyrighted digital content with an online purchasing method, comprising:
   searching by a user for a desired digital content on a retrieval platform;
   selecting by the user to purchase the desired digital content using the online purchasing method as defined in a copyright description file of the desired digital content;
   transmitting the copyright description file of the desired digital content and a user-selected licensing method to a transaction platform;

connecting the transaction platform to the user for a payment;

transmitting a digital signature from the transaction platform to the user, the digital signature being a payment receipt of the desired digital content for the user;

verifying the digital signature by a digital content provider of the desired digital content and issuing a new copyright description file for the desired digital content for the user based on information of the user and the user-selected licensing method; and accessing the desired digital content by the user according to the user-selected licensing method.

7. The method as claimed in claim 6, comprising:

registering the digital content provider at a retrieval platform;

registering bank account information to the transaction platform for the digital content provider; and uploading a digital content file from the desired digital content to the retrieval platform.

8. The method as claimed in claim 6, wherein the digital content can be stored, demonstrated or applied using a digital methods, and can be software, a game, music, a video image or a digital picture.

9. The method as claimed in claim 6, wherein the searching further includes providing the desired digital content and supported authorization methods for the retrieval platform.

10. The method as claimed in claim 6, wherein the user is a person or a digital content provider.

11. The method as claimed in claim 6, wherein the payment includes a payment via a credit card, an Internet banking service, a micro payment, an ATM service.

12. The method as claimed in claim 6, wherein the digital signature includes copyright description file, the user selected licensing method and a record of time of a transaction transmitted from the retrieval platform.

13. The method as claimed in claim 6, wherein the accessing further comprises collecting payment receipts from the transaction platform by the content provider to obtain payments.

14. A method for transacting, purchasing and publishing copyrighted digital content with an online pay-per-use method, comprising:

searching by a user for a desired digital content on a retrieval platform;

selecting by the user to purchase the desired digital content using the online pay-per-use method as defined in a copyright description file of the desired digital content;

transmitting the copyright description file of the desired digital content and a user-selected licensing method to a transaction platform;

connecting the transaction platform to the user for a payment to buy electronic money;

transmitting a digital signature and the electronic money from the transaction platform to the user;

verifying the digital signature and the electronic money by a digital content provider of the desired digital content and issuing a new copyright description file for the desired digital content for the user based on the user's information and the user selected licensing method; and transferring payment by the user using the electronic money to the digital content provider every time the user accesses the digital content.

15. The method as claimed in claim 14, further comprising:

registering the digital content provider at the retrieval platform;

registering bank account information to a transaction platform for the digital content provider; and uploading a digital content file from the desired digital content to the retrieval platform.

16. The method as claimed in claim 14, wherein the digital content can be stored, demonstrated or applied using digital methods, and can be software, a game, music, a video image or a digital picture.

17. The method as claimed in claim 14, wherein the searching further comprises providing the desired digital content and authorization methods for the retrieval platform.

18. The method as claimed in claim 14, wherein the user is a person or a digital content provider.

19. The method as claimed in claim 14, wherein the electronic money can be bought by a credit card, an Internet banking service, a micro payment, an ATM service.

20. The method as claimed in claim 14, wherein the electronic money is cash card, points card or a micro payment.

21. The method as claimed in claim 14, wherein, after arrived to a predetermine value, the digital content provider collects and sends all user paid electronic money to the transaction platform to obtain payments.

22. The method as claimed in claim 21, wherein the predetermine value is a fixed number of times or a fixed time period.

23. A method for transacting, purchasing and publishing copyrighted digital content a fixed number of times or for a fixed time period online after the user has finished using the copyrighted digital content, comprising:

searching by a user for a desired digital content on a retrieval platform;

selecting by the user to purchase the desired digital content and to use a fixed number of times or fixed time period online after the user has finished using the copyrighted digital content method as defined in a copyright description file of the desired digital content;

transmitting the copyright description file of the digital content and a licensed digital content selected by the user from the retrieval platform to a digital content provider of the desired digital content;

signing a new copyright description file for the selected licensed digital content transmitted to the user from the digital content provider;

transmitting a signed payment letter of authorization from the user to the digital content provider;

using the desired digital content legally according to the new copyright description file by the user;

presetting a predetermined value by the digital content provider to collect payments to the transaction platform; and paying by the user to the transaction platform for transactions.

24. The method as claimed in claim 23, further comprising:

registering the digital content provider at the retrieval platform;

registering bank account information to a transaction platform for the digital content provider; and uploading a digital content file from the desired digital content to the retrieval platform.

25. The method as claimed in claim 23, wherein the digital content can be stored, demonstrated or applied using digital methods, and can be software, a game, music, a video image or a digital picture.

26. The method as claimed in claim 23, wherein the searching further comprises providing the desired digital content and authorization methods for the retrieval platform.

27. The method as claimed in claim 23, wherein the user is a person or a digital content provider.

28. The method as claimed in claim 23, wherein the new copyright description file includes ticket information.

29. The method as claimed in claim 23, wherein the payment letter of authorization includes a digital content description file, payment information and a record of the time of the signing.

30. The method as claimed in claim 23, wherein the digital content provider in accordance with the ticket information records the number of times the digital content is accessed or used and the time at which it is accessed or used by the user.

31. The method as claimed in claim 23, wherein the predetermined value is a fixed number of times or a fixed time period.

32. The method as claimed in claim 23, wherein the paying can via be a credit card, an Internet banking service, a micro payment, or an ATM service.

33. A method for transacting, purchasing and publishing a copyrighted digital content using a prepaid offline method, comprising:
  searching by a user for a desired digital content on a retrieval platform;
  selecting by the user to purchase the digital content using the prepaid offline method as defined in a copyright description file of the desired digital content;
  transmitting the copyright description file of the digital content and a licensed digital content selected by the user from the retrieval platform to a transaction platform;
  transmitting a digital signature from the transaction platform to the user, wherein the digital signature is a payment receipt for the user after the user makes a payment to the transaction platform;
  the digital content provider signing a new copyright description file for the user after verifying the digital signature's validity and packeting the desired digital content;
  downloading the packeted content of the desired digital content to the user and de-packeting the packeted content by the user;
  accessing and using the digital content by a browser program or a hardware device which can control and management the user accessing and using the licensed digital content legally; and
  collecting all users' payment receipts by the at least one digital content provider and send to the transaction platform to get charges.

34. The method as claimed in claim 33, further comprising:
  registering the digital content provider at the retrieval platform;
  registering bank account information to a transaction platform for the digital content provider; and
  uploading a digital content file from the desired digital content to the retrieval platform.

35. The method as claimed in claim 33, wherein the digital content can be stored, demonstrated or applied using digital methods, and can be software, a game, music, a video image or a digital picture.

36. The method as claimed in claim 33, wherein the user is a person or a digital content provider.

37. The method as claimed in claim 33, wherein the transmitting a copyright description file step further comprises selecting any type of payment from the user to the transaction platform.

38. The method as claimed in claim 37, wherein the method of payment is via a credit card, an Internet banking service, a micro payment, or an ATM service.

39. The method as claimed in claim 33, wherein the digital signature includes a copyright description file, the user selected licensing method and a record of the time of the transaction transmitted from the retrieval platform.

40. The method as claimed in claim 33, wherein the packet content encrypts the digital content using a session key from the digital content provider with a symmetric key encryption algorithm.

41. The method as claimed in claim 40, wherein the session key is encrypted using the user's public key and put in the new copyright description file.

42. The method as claimed in claim 33, wherein the de-packeting uses the encrypted session key obtained from the new digital content description files, decrypts the session key using the user's private key, and then decrypts the packet content using the session key.

43. A method for ransoming purchased copyrighted digital content, comprising:
  requesting for ransoming of a purchased copyrighted digital content from a user to a digital content provider of the copyrighted digital content;
  revoking a copyright description file of the purchased copyrighted digital content by the user, so as to stops the user from accessing or using the copyrighted digital content;
  signing a digital signature by the digital content provider for the user as a refund voucher;
  requiring a transaction platform payment to the user in accordance with the refund voucher; and
  selecting a payment method by the digital content providers through the transaction platform.

44. The method as claimed in claim 43, wherein the user is a person or a digital content provider.

45. The method as claimed in claim 43, wherein the digital signature includes a copyright description file and a record of the time of the signing.

46. The method as claimed in claim 43, wherein the method of payment is a credit card or an Internet banking service.

47. A method for transacting, purchasing and publishing copyrighted digital content with online copyright transference, comprising:
  prepaying an amount of money or using a gift certificate from a transaction platform;
  requesting a copyright transfer and providing information of a new user by current copyright user to a digital content provider of the copyrighted digital content;
  revoking a copyright description file for the current copyright user's to stop the current copyright user from using the copyrighted digital content file;
  re-signing a new copyright description file by the digital content provider to the new copyright user, so as to allow the new copyright user to access and use the copyrighted digital content; and
  sending payment receipts by the digital content provider to the transaction platform in accordance with the prepayment of the small amount of money, the gift certificate or the electronic payment to obtain payments.

48. The method as claimed in claim 47, wherein the method of payment is a credit card, or an Internet banking service.

* * * * *

UNITED STATES PATENT AND TRADEMARK OFFICE
CERTIFICATE OF CORRECTION

PATENT NO.       : 7,627,892 B2                           Page 1 of 1
APPLICATION NO.  : 11/169661
DATED            : December 1, 2009
INVENTOR(S)      : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Second Day of November, 2010

David J. Kappos
*Director of the United States Patent and Trademark Office*